United States Patent [19]

Matsuura et al.

[11] Patent Number: 5,516,577
[45] Date of Patent: May 14, 1996

[54] ORGANIC ELECTROLUMINESCENCE DEVICE

[75] Inventors: Masahide Matsuura; Tadashi Kusumoto; Hiroshi Tokailin, all of Sodegaura, Japan

[73] Assignee: Idemitsu Kosan Co., Ltd., Tokyo, Japan

[21] Appl. No.: 58,214

[22] Filed: May 10, 1993

[30] Foreign Application Priority Data

May 11, 1992 [JP] Japan .................................. 4-117104

[51] Int. Cl.$^6$ .............................. B32B 7/02; H05B 33/14
[52] U.S. Cl. ........................ 428/212; 428/690; 428/917; 428/411.1; 428/457; 313/503; 313/504; 313/506
[58] Field of Search ..................... 313/503, 504, 313/506; 428/917, 689, 690, 411.1, 457, 212

[56] References Cited

U.S. PATENT DOCUMENTS

| | | |
|---|---|---|
| 5,130,603 | 7/1992 | Tokailin et al. |
| 5,141,671 | 8/1992 | Bryan et al. .......................... 252/301.16 |
| 5,456,988 | 10/1995 | Sano et al. ................................ 428/690 |

FOREIGN PATENT DOCUMENTS 0502202  9/1992  European Pat. Off.

OTHER PUBLICATIONS

Database WPI, Derwent Publications Ltd., AN 93–004717, JP–A–4 332 787, Nov. 19, 1992.

*Primary Examiner*—Patrick J. Ryan
*Assistant Examiner*—Marie R. Yamnitzky
*Attorney, Agent, or Firm*—Oblon, Spivak, McClelland, Maier & Neustadt

[57] ABSTRACT

An organic electroluminescence device which comprises laminating layers in the order of anode/light emitting layer/adhesive layer/cathode, or anode/hole-injecting layer/light emitting layer/adhesive layer/cathode, the energy gap of the light emitting layer being larger than that of 8-hydroxyquinoline or metal complex thereof and contained in the adhesive layer, the light emitting layer comprising a compound which emits a blue, greenish blue or bluish green light in CIE chromaticity coordinates, and the adhesive layer including a metal complex of 8-hydroxyquinoline or a derivative thereof and at least one organic compound in an arbitrary region in the direction of the thickness of the layer, the thickness of which is smaller than that of the above-mentioned light emitting layer.

According to the above organic electroluminescence device, improvements in uniformity in light emission and emission efficiency are realized.

7 Claims, No Drawings

ORGANIC ELECTROLUMINESCENCE DEVICE

BACKGROUND OF THE INVENTION

1. Field of the Invention

The present invention relates to an organic electroluminescence device, and more particularly, to an organic electroluminescence device capable of improving the uniformity of light emission and retarding the lowering in initial luminances.

2. Description of the Relates Arts

Since an electroluminescence device (hereinafter referred to as EL device) has features in a high self-distinguishability because of its self-emission, and having a high impact resistance because it is a completely solid device, various devices using inorganic and organic compounds are proposed at present and attempts to put them into practice use have been made. Among these devices, organic EL devices permit drastically low voltage to be applied, and therefore developments of various materials for these devices as well as devices have been undertaken.

The above organic EL device basically comprises anode/light emitting layer/cathode, and those which are provided with a hole injecting layer or electron-injecting layer at need for improving the light emitting property. In this structure of the device, the cathode must be sufficiently adhered to the light emitting layer. If the adhesivity is not sufficient, the mechanical strength of the device becomes low, causing ununiform light emission, and in the worst case non-emission regions. Furthermore, ununiformity of the load in the light emitting face is caused, which accelerates the deterioration to shorten the lifetime of the device, and this is an obstacle to practical use of the device.

Heretofore, it has been known that an electron-injecting layer or a hole barrierer layer is provided, at need, between the light emitting layer and the cathode. In these techniques, particularly when the latter layer is provided, the material is selected depending on the difference from the light emitting layer in the energy level, and the material must fit to this concept. An example of them is a technique of "providing a hole blocking layer (hole barrier layer) having a first oxidation voltage 0.1 V higher than that of the light emitting layer, between the light emitting layer and the cathode" (Japanese Patent Application Laid-Open No. 195683/1990). Also in Japanese Patent Application Nos. 195683/1990 and 255788/1990, 8-hydroxyquinoline derivative is used as the hole barrier layer basing on the above concept, but the emission efficiency of blue lights in these arts are still so low as 0.3 (1 m.W$^{-1}$). On the other hand, when the materials described in Japanese Patent Application Laid-Open No. 231070/1991 and Japanese Patent Application No. 279304/1990 are used for the light emitting layer, an emission of blue light in a high brightness can be obtained. These materials are mentioned as effective materials for full-colorization of flat panel displays and the like in future. However, when these materials are formed to devices in the structure of anode/light emitting layer/cathode/, or anode/hole injecting layer/light emitting layer/cathode as described before, ununiform emission or non-emission region are sometimes caused, which have brought about problems in analyzing the practical use of the devices concerning lifetime of the device, minute processing of the device.

On the other hand, as the means to dissolve the above-mentioned problems, the doping technique (Japanese Patent Application Laid-Open No. 255190/1991, The Institute of Electronics, Information and Communication Engineers(IEICE) Technical Report (vol. 91, No. 406(1991), p47), Polymer Preprints Japan (vol. 40, No. 10 (1991))) and the like have been disclosed.

These aim at improving the properties by contaminating a second component into the light emitting layer. However, when the second component is contaminated into the light emitting layer, a possible fall in emission efficiency or change in the color of the emitting light have had to be considered sufficiently.

SUMMARY OF THE INVENTION

Under these circumstances, after intensively studying the adhesivity between the light emitting layer and the cathode, the present inventors found that an EL device having an improved uniformity of light emission and an improved emission efficiency can be obtained by contaminating a second component into the layer (adhesive layer) to improve the adhesivity between the light emitting layer and the cathode, without changing the color of the emission light, while the characteristics of EL devices maintained.

The present invention has been accomplished on the basis of such a knowledge.

That is, the present invention provides an organic electroluminescence device which comprises laminating layers in the order of anode/light emitting layer/adhesive layer/cathode, or anode/hole injecting layer/light emitting layer/adhesive layer/cathode, the energy gap of the light emitting layer being larger than that of 8-hydroxyquinoline or metal complex thereof and contained in the adhesive layer, and the adhesive layer including a metal complex of 8-hydroxyquinoline or a derivative thereof and at least one organic compound in an arbitrary region in the direction of the thickness of the layer, the thickness of which is smaller than that of the above-mentioned light emitting layer.

The present invention also provides an organic electroluminescence device which comprises laminating layers in the order of anode/light emitting layer/adhesive layer/cathode, or anode/hole-injecting layer/light emitting layer/adhesive layer/cathode, the light emitting layer comprising a compound which emits a blue, greenish blue or bluish green light in CIE chromaticity coordinates, the adhesive layer including a metal complex of 8-hydroxyquinoline or a derivative thereof and at least one organic compound in an arbitrary region in the direction of the thickness of the layer, the thickness of which is smaller than that of the above-mentioned light emitting layer.

DESCRIPTION OF THE PREFERRED EMBODIMENTS

The organic EL device of the present invention comprises laminating layers in the order of anode/light emitting layer/adhesive layer/cathode, or anode/hole injecting layer/light emitting layer/adhesive layer/cathode.

As to the anode in the organic EL device of the present invention, a metal, an alloy, an electro-conducting compound or a mixture thereof, all having a large work function (not less than 4 eV), is preferably used as an electrode material. Specific examples of these electrode materials are metals such as Au, and a dielectric transparent materials such as CuI, ITO, SnO$_2$, and ZnO. Said anode can be prepared by forming said electrode material into thin film by vapor deposition or sputtering. To obtain light emission from said electrode, it is preferable that the transmittance of the electrode is more than 10% and the resistance of the sheet as an electrode is not more than several hundred Ω/□.

The film thickness of the anode is usually in the range of 10 nm to 1 μm, preferably 10 to 200 nm, depending upon the material.

On the other hand, as the cathode, a metal, an alloy, an electroconducting compound or a mixture thereof, all having a small work function (not more than 4 eV) is preferably used as an electrode material. Specific examples of such electrode materials are sodium, a sodium-potassium alloy, magnesium, lithium, a mixture of magnesium and copper, Al/AlO$_2$, indium, and rare earth metals. Said cathode can be prepared by forming said electrode material into thin film by vapor deposition or sputtering. The resistance of the sheet as an electrode is preferably not more than several hundred Ω/□. The film thickness is usually in the range of 10 nm to 1 μm, preferably 50 to 200 nm. In the EL device of the present invention, it is preferable that either anode or cathode be transparent or translucent because light emission is transmitted and obtained with a high efficiency.

Next, the light emitting layer in the above-mentioned device possesses, similarly to the conventional light emitting layer, (i) injecting function (at application of voltage, holes can be injected from the anode or the hole-injecting layer, and electrons can be injected from the cathode or the electron-injecting layer), (ii) transporting function (positive holes and electrons can be moved by the power of electric field), and (iii) light emitting function (to provide a place for recombination of holes and electrons, permitting light emission). The thickness of said layer is not particularly limited, but can be appropriately selected depending on circumstances, and it is preferably 1 nm to 10 μm, and particularly preferably 5 nm to 5 μm.

The light emitting layer of the present invention is characterized by having an energy gap larger than that of 8-hydroxyquinoline or metal complex thereof contained in the adhesive layer, and comprising a compound which emits blue, greenish blue, or bluish green light in CIE chromaticity coordinates.

Therein, energy gap means a value of energy corresponding to the wavelength of absorption ends of the absorption spectrum of thin film, indicating the value corresponding to the difference in energy between the maximum population level and the minimum population level of electron orbit. Said value of energy gap can be determined from the absorption ends of the absorption spectrum of thin film to be used, or the measurement by internal photoelectric effect using a material of known work function as the electrode.

Specific examples of the material of this light emitting layer are tetraphenylbutadiene compounds (see Japanese Patent Application No. 96990/1992) and compounds represented by general formula (I), (II) and (III) as follows.

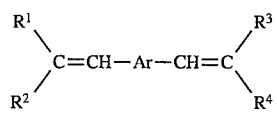 (I)

wherein $R^1$ to $R^4$ indicate each a hydrogen atom, an alkyl group having 1 to 6 carbon atoms, an alkoxyl group having 1 to 6 carbon atoms, an aralkyl group having 7 to 8 carbon atoms, a substituted or unsubstituted aryl group having 6 to 18 carbon atoms, a substituted or unsubstituted cyclohexyl group, a substituted or unsubstituted aryloxyl group having 6 to 18 carbon atoms, or an alkoxyl group having 1 to 6 carbon atoms; therein, the substituent is an alkyl group having 1 to 6 carbon atoms, an alkoxyl group having 1 to 6 carbon atoms, an aralkyl group having 7 to 8 carbon atoms, an aryloxyl group having 6 to 18 carbon atoms, an aryl group having 1 to 6 carbon atoms, an acyloxy group having 1 to 6 carbon atoms, a carboxyl group, a styryl group, an arylcarbonyl group having 6 to 20 carbon atoms, an aryloxycarbonyl group having 6 to 20 carbon atoms, an alkoxycarbonyl group having 1 to 6 carbon atoms, a vinyl group, an anilinocarbonyl group, a carbamoyl group, a phenyl group, a nitro group, a hydroxyl group or a halogen; these substituents may be used solely or in plural; $R^1$ to $R^4$ may be identical to or different from one another, and $R^1$ and $R^2$ and $R^3$ and $R^4$ may combine with groups substituting each other to form a substituted or unsubstituted saturated five-membered ring or a substituted or unsubstituted saturated six-membered ring; Ar indicates a substituted or unsubstituted arylene group having 6 to 20 carbon atoms, a single bond, or a conjugated polyene 2 to 6 carbon atoms; an arylene group therein may be mono-substituted or poly-substituted, and its position may be any of ortho-, para- and meta-; however, when Ar is an unsubstituted phenylene, $R^1$ to $R^4$ is each selected from the group consisting of an alkoxyl group having 1 to 6 carbon atoms, an aralkyl group having 7 to 8 carbon atoms, a substituted or unsubstituted naphthyl group, a biphenyl group, a cyclohexyl group, and an aryloxyl group, general formula (II):

 (II)

wherein A and B indicate each a monovalent group which is obtained by removing a hydrogen atom from the compound represented by the above general formula (I), and may be identical to or different from each other; Q indicates a divalent group breaking the conjugation, or general formula (III)

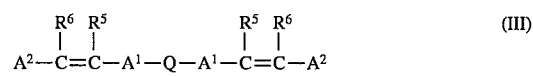 (III)

wherein $A^1$ indicates a substituted or unsubstituted arylene group having 6 to 20 carbon atoms or a divalent aromatic heterocyclic group; its position may be any of ortho-, meta- and para-; $A^2$ is a substituted or unsubstituted aryl group having 6 to 20 carbon atoms or a monovalent aromatic heterocyclic group; $R^5$ and $R^6$ indicate each a hydrogen atom, a substituted or unsubstituted aryl group having 6 to 20 carbon atoms, a cyclohexyl group, a monovalent aromatic heterocyclic group, an alkyl group having 1 to 10 carbon atoms, an aralkyl group having 7 to 20 carbon atoms or an alkoxyl group having 1 to 10 carbon atoms; $R^5$ and $R^6$ may be identical to or different from each other; the mono-substituent therein is an alkyl group, an aryloxyl group, an amino group or a phenyl group with or without a substituent; each substituent of $R^5$ may combine with $A^1$ to form a saturated or unsaturated five-membered ring or six-membered ring, and similarly each substituent of $R^6$ may combine with $A^2$ to form a saturated or unsaturated five-membered ring or six-membered ring; Q indicates a divalent group breaking a conjugation, and emits a blue, greenish blue or bluish green light in CIE chromaticity coordinates, said adhesive layer being a layer including a metal complex of 8-hydroxyquinoline or its derivative and at least one of organic compound in an arbitrary region in the direction of the thickness of the layer, the thickness of which is smaller than that of the above-mentioned light emitting layer.

Herein, $R^1$ to $R^4$ in general formula (I) may be identical to or different from one another as described before, and each indicates a hydrogen atom, an alkyl group having 1 to 6 carbon atoms (such as a methyl group, an ethyl group, a n-propyl group, an i-propyl group, a n-butyl group, an i-butyl group, a sec-butyl group, a tert-butyl group, an isopentyl group, a t-pentyl group, a neopentyl group, and an isohexyl group), an alkoxyl group having 1 to 6 carbon atoms (such as a methoxyl group, an ethoxyl group, a propoxyl group, and a butoxyl group), an aralkyl group having 7 to 8 carbon atoms (such as a benzyl group, and a phenethyl group), an aryl group having 6 to 18 carbon atoms (such as a phenyl group, a biphenyl group, and a naphthyl group), a cyclohexyl group, or an aryloxyl group having 6 to 18 carbon atoms (such as a phenoxyl group, a biphenyloxyl group, and a naphthyloxyl group).

$R^1$ to $R^4$ may be groups resulted by combining the above with substituents. Specifically, $R^1$ to $R^4$ indicate each a substituent-containing phenyl group, a substituent-containing aralkyl group, a substituent-containing cyclohexyl group, a substituent-containing biphenyl group, or a substituent-containing naphthyl group. The substituent therein includes an alkyl group having 1 to 6 carbon atoms, an alkoxyl group having 1 to 6 carbon atoms, an aralkyl group having 7 to 8 carbon atoms, an aryloxyl group having 6 to 18 carbon atoms, an acyl group having 1 to 6 carbon atoms, an acyloxyl group having 1 to 6 carbon atoms, an aryloxycarbonyl group having 6 to 20 carbon atoms, a carboxyl group, a styryl group, an arylcarbonyl group having 6 to 20 carbon atoms, an alkoxycarbonyl group having 1 to 6 carbon atoms, a vinyl group, an anilinocarbonyl group, a carbamoyl group, a phenyl group, a nitro group, a hydroxyl group or a halogen, and may be poly-substituted. Accordingly, for example, a substituent-containing aralkyl group includes alkyl group-substituted aralkyl groups (such as methylbenzyl group, and methylphenethyl group), alkoxyl group-substituted aralkyl groups (such as methoxybenzyl group and an ethoxyphenethyl group), aryloxyl group-substituted aralkyl groups (such as phenoxybenzyl group, and naphthyloxyphenethyl group), phenyl group-substituted aralkyl group (such as phenylphenethyl group); above-mentioned substituent-containing phenyl groups include alkyl group-substituted phenyl groups (such as tolyl group, dimethylphenyl group, and ethylphenyl group), alkoxyl group-substituted phenyl groups (such as methoxyphenyl group, and ethoxyphenyl group), aryloxyl group-substituted phenyl groups (such as phenoxyphenyl group, and naphtyloxyphenyl group) and phenyl group-substituted phenyl group (that is, biphenylyl group). Substituent-containing cyclohexyl groups include alkyl group-substituted cyclohexyl group (such as methylcyclohexyl group, dimethylcyclohexyl group, and ethylcyclohexyl group), alkoxy group-subsituted cyclohexyl groups (such as methoxycyclohexyl group, and ethoxycyclohexyl group), aryloxyl group-substituted cyclohexyl groups (such as phenoxycyclohexyl group, and naphthyloxycyclohexyl group), and phenyl group-substituted cyclohexyl groups (such as phenylcyclohexyl group). Substituent-containing naphthyl groups include alkyl group-substituted naphthyl groups (such as methylnaphtyl group, and dimethylnaphthyl group), alkoxyl group-substituted naphthyl group (such as methoxynaphthyl group, and ethoxynaphthyl group), aryloxyl group-substituted naphthyl group (such as phenoxynaphthyl group and naphthyl oxylnaphthyl group), and phenyl group-substituted naphthyl group.

As $R^1$ to $R^4$, among the above, each an alkyl group having 1 to 6 carbon atoms, an aryloxyl group, a phenyl group, a naphthyl group, a biphenyl group, or a cyclohexyl group is preferable. They may be substituted or unsubstituted. $R^1$ to $R^4$ may be identical to or different from one another, and R1 and $R^2$ and $R^3$ and $R^4$ may combine with the substituents one another to form a substituted or unsubstituted saturated five-membered ring or substituted or unsubstituted saturated six-membered ring.

On the other hand, Ar in general formula (I) indicates a substituted or unsubstituted aryl group having 6 to 20 carbon atoms, that is, an arylene group such as a substituted or unsubstituted phenylene group, a biphenylene group, p-terphenylene group, a naphthylene group, a terphenylene group, a naphthalenediyl group, an anthracenediyl group, phenanthrenediyl group, and a phenalenediyl group, and may be unsubstituted or substituted. The position of methylidine (=C=CH—) may be any of ortho-, meta-, and para-. However, when Ar is an unsubstituted phenylene, $R^1$ to $R^4$ are each selected from the group consisting of an alkoxyl group having 1 to 6 carbon atoms, an aralkyl group having 7 to 8 carbon atoms, a substituted or unsubstituted naphthyl group, a biphenyl group, a cyclohexyl group, and an aryloxyl group. The substituent includes an alkyl group (such as a methyl group, an ethyl group, a n-propyl group, an i-propyl group, a n-butyl group, an i-butyl group, a sec-butyl group, a t-butyl group, an isopentyl group, a t-pentyl group, a neopentyl group, and an isohexyl group), an alkoxyl group (such as a methoxyl group, an ethoxyl group, a propoxyl group, an i-propoxyl group, a butyloxyl group, an i-butyloxyl group, a sec-butyloxyl group, a t-butyloxyl group, an isopentyloxyl group, and a t-pentyloxyl group), an aryloxyl group (such as a phenoxyl group, and a naphthyloxyl group), an acyl group (such as a formyl group, an acetyl group, a propionyl group, and a butylyl group), an acyloxyl group, an aralkyl group (such as a benzyl group, and a phenethyl group), a phenyl group, a hydroxyl group, a carboxyl group, an anilinocarbonyl group, a carbamoyl group, an aryloxycarbonyl group, a methoxycarbonyl group, an ethoxycarbonyl group, a butoxycarbonyl group, a nitro group, and a halogen, and may be mono-substituted or poly-substituted.

Dimethylidine aromatic compound represented by the above-mentioned formula (I) contains two methylidine units (=C=CH—) in one molecule, varying in four combinations according to the geometrical isomerism of said methylidine unit, that is, cis-cis, trans-cis, cis-trans and trans-trans. The light emitting layer of the present invention may be any of them, or may be mixtures of geometrical isomers. Particularly preferred one comprises trans isomer only.

The above-mentioned substituent may combine among substituents to form a substituted or unsubstituted saturated five-membered ring or six-membered ring.

A and B in general formula (II) indicate each a monovalent group resulted by removing one hydrogen atom from the compounds represented by the above-mentioned general formula (I), and may be identical to or different from each other. Therein Q indicates a divalent group breaking the conjugation.

The conjugation therein is attributed to the delocalization of π-electron, and includes a conjugated double bond or a conjugation due to an unpaired electron or a lone electron-pair. Q indicates specifically a divalent group which results from removing each one hydrogen atom from a straight chain alkane, such as:

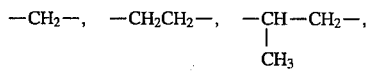

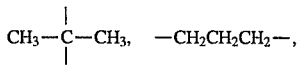

-continued

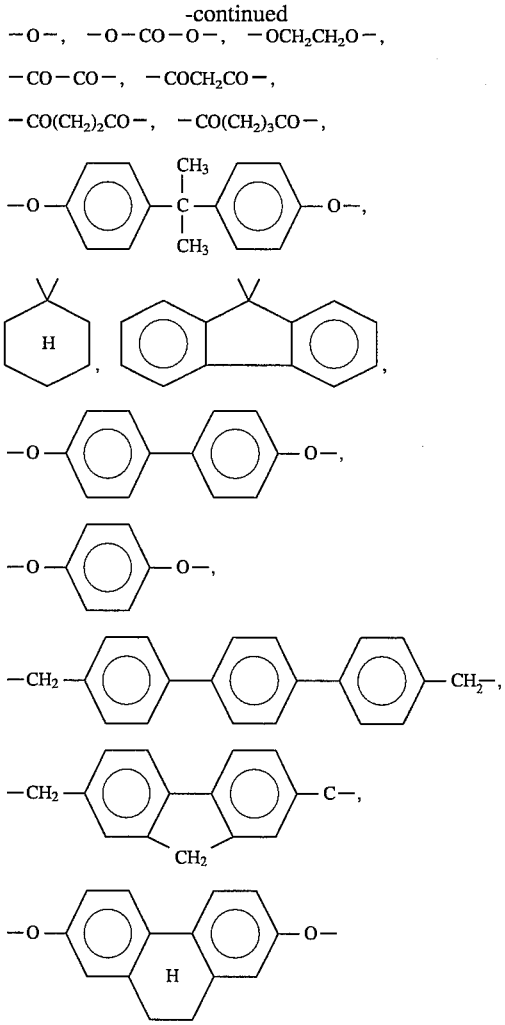

The divalent group breaking the conjugation is thus used for the purpose that EL emission light obtained when A or B shown in above (that is, the compound of general formula (I)) is used solely as the organic EL device of the present invention and the EL emission light obtained when the compound represented by general formula (II) is used as the organic EL device of the present invention may be identical in color. In other words, said divalent group is used so that the wavelength of the light emitting layer represented by general formula (I) or general formula (II) may not be changed to shortened or lengthened. By combining with a divalent group to break conjugation, it is confirmed that the glass transition temperature (Tg) rises, and uniform pinhole free minute crystal or amorphous thin film can be obtained, improving the uniformity of light emission. Further, combining with a divalent group breaking the conjugation brings about advantages that EL emission is not long-wavened, and synthesis or purification can be easily effected.

Moreover, $A^1$ in general formula (III) indicates an arylene group having 6 to 20 carbon atoms, and a divalent aromatic heterocyclic group, and $A^2$ indicates an aryl group having 6 to 20 carbon atoms (such as a phenyl group, a biphenyl group, and a naphthyl group), or a monovalent aromatic heterocyclic group. $R^5$ and $R^6$ indicates each a hydrogen atom, a substituted or unsubstituted aryl group having 6 to 20 carbon atoms, a cyclohexyl group, a monovalent aromatic heterocyclic group, an alkyl group having 1 to 10 carbon atoms (such as a methyl group, an ethyl group, a n-propyl group, an i-propyl group, a n-butyl group, an i-butyl group, a sec-butyl group, a tert-butyl group, an isopentyl group, at-pentyl group, a neopentyl group, and an isohexyl group), an aralkyl group having 7 to 20 carbon atoms (such as a benzyl group, and a phenethyl group), or an alkoxyl group having 1 to 10 carbon atoms (such as a methoxyl group, an ethoxyl group, a propoxyl group, and a buthoxyl group). $R^5$ and $R^6$ may be identical to or different from each other. A substituent therein is, in mono-substitution, an alkyl group, an aryloxyl group, an amino group or a substituted or unsubstituted phenyl group. Each substituent in $R^5$ may combine with $A^1$ to form a saturated or unsaturated five-membered ring or six-membered ring, and similarly each substituent in $R^6$ may combine with $A^2$ to form a saturated or unsaturated five-membered ring or six-membered ring. Q indicates a divalent group breaking conjugation as described above.

Further, in the present invention, the light emitting layer represented by general formula (I), general formula (II) or general formula (III) must be a compound providing an emission of blue, greenish blue or bluish green light in CIE chromaticity coordinates.

The above-mentioned light emitting layer can be prepared by forming the above compound into thin film by a known method such as the vapor deposition method, the spin-coating method, the casting method or the LB method, but particularly, a molecular accumulated film is preferable. A molecular accumulated film therein is a thin film formed by depositing said compound from a gaseous state, or a thin film formed by solidification of said compound from a solution or liquid state. Usually, said molecular accumulated film is distinguished from a thin film (molecular built-up film) formed by the LB method, by the difference in the aggregation structure or the higher-order structure, or the functional difference resulting therefrom.

Said light emitting layer, as disclosed in Japanese Patent Application Laid-Open No. 194393/1984, can be formed by dissolving a binding agent such as a resin and said compound in a solvent to prepare solution, which is formed into thin film by the spin-coating method and the like.

The film thickness of the light emitting layer thus formed is not particularly limited, and can be determined appropriately according to the circumstances. Usually, it is preferably in the range of 1 nm to 10 μm, particularly preferably 5 nm to 5 μm.

As described above, the light emiting layer of the present invention has an injection function of injecting holes from the anode or the hole-injecting layer, and electrons from the cathode or the adhesive and transporting layer upon application of an electric field, a transport function of transporting injected charges (holes and electrons) by the action of an electric field, and a light emitting function of providing a field for recombination of electrons and holes, thereby emitting light. There may be a difference in between injectability of holes and electrons, and a difference in transporting ability represented by mobilities of holes and electrons, but it is preferable to move either one.

Herein examples of compounds to be used as the above-mentioned light emitting layer are shown as follows.

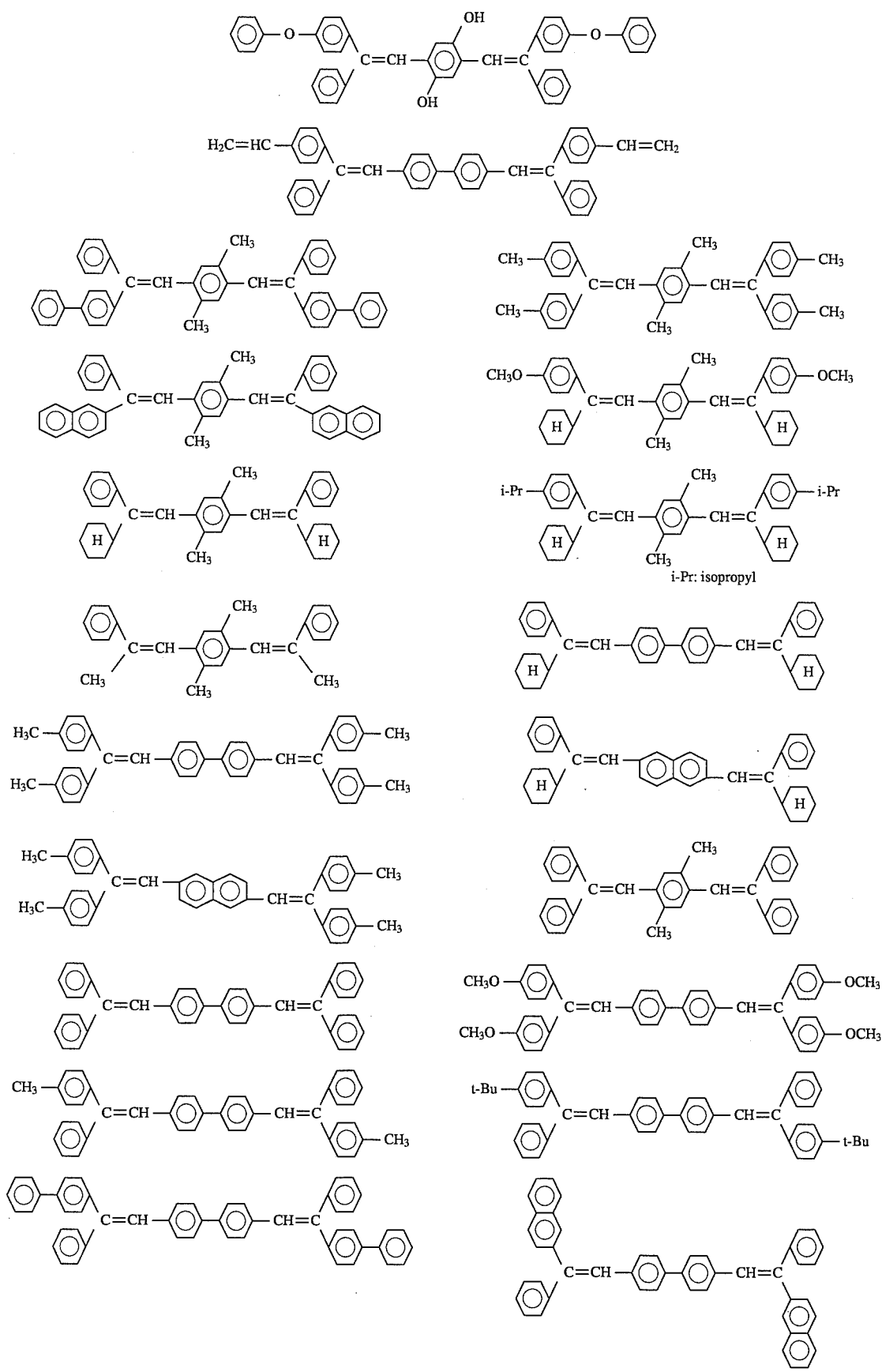

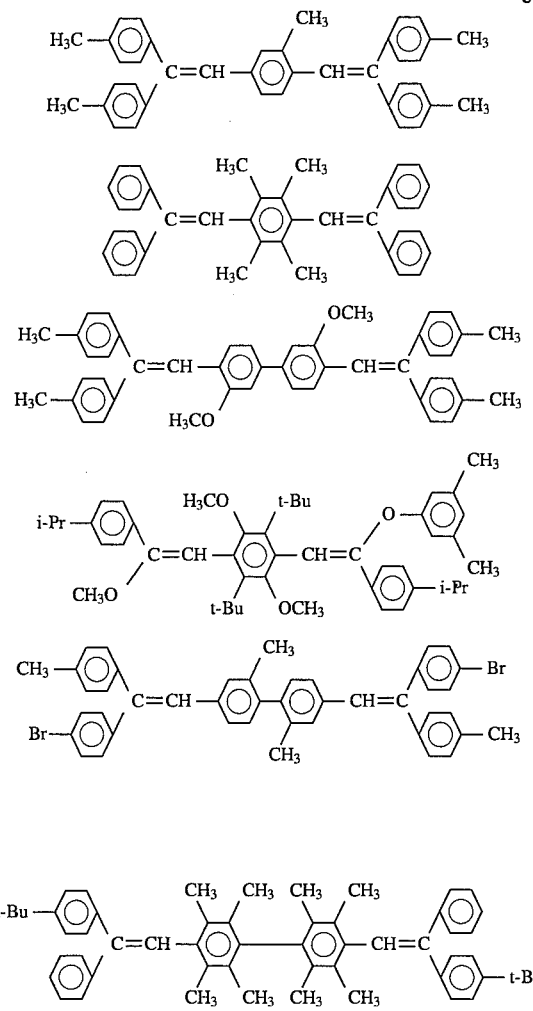
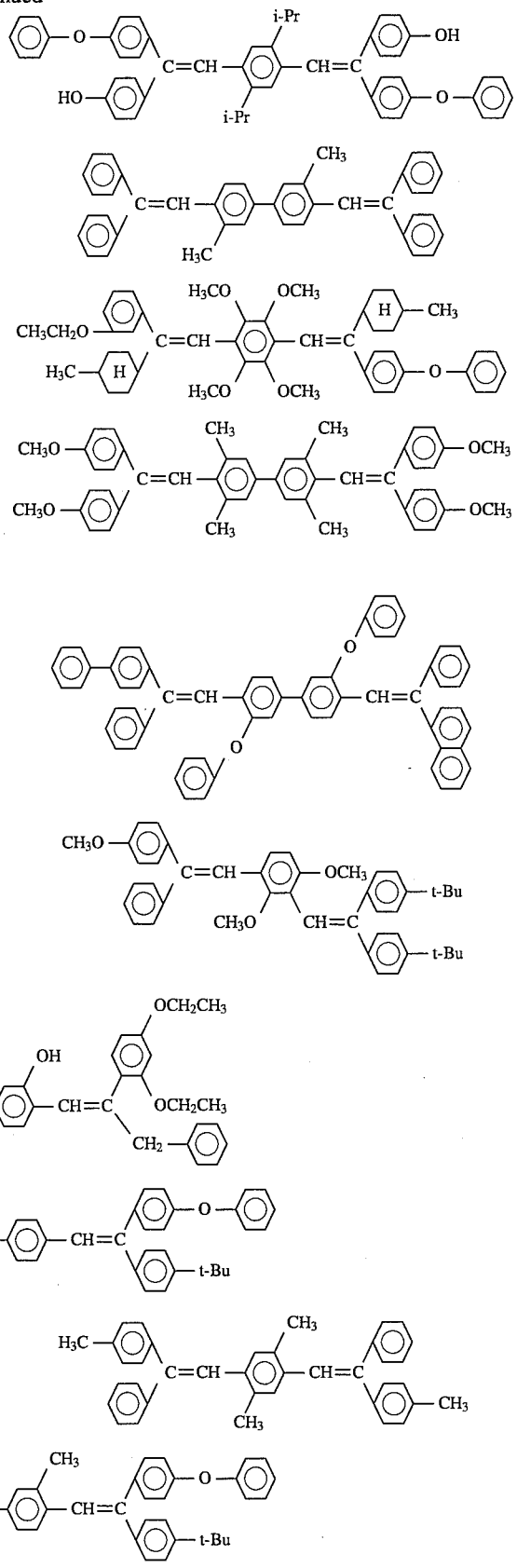

-continued

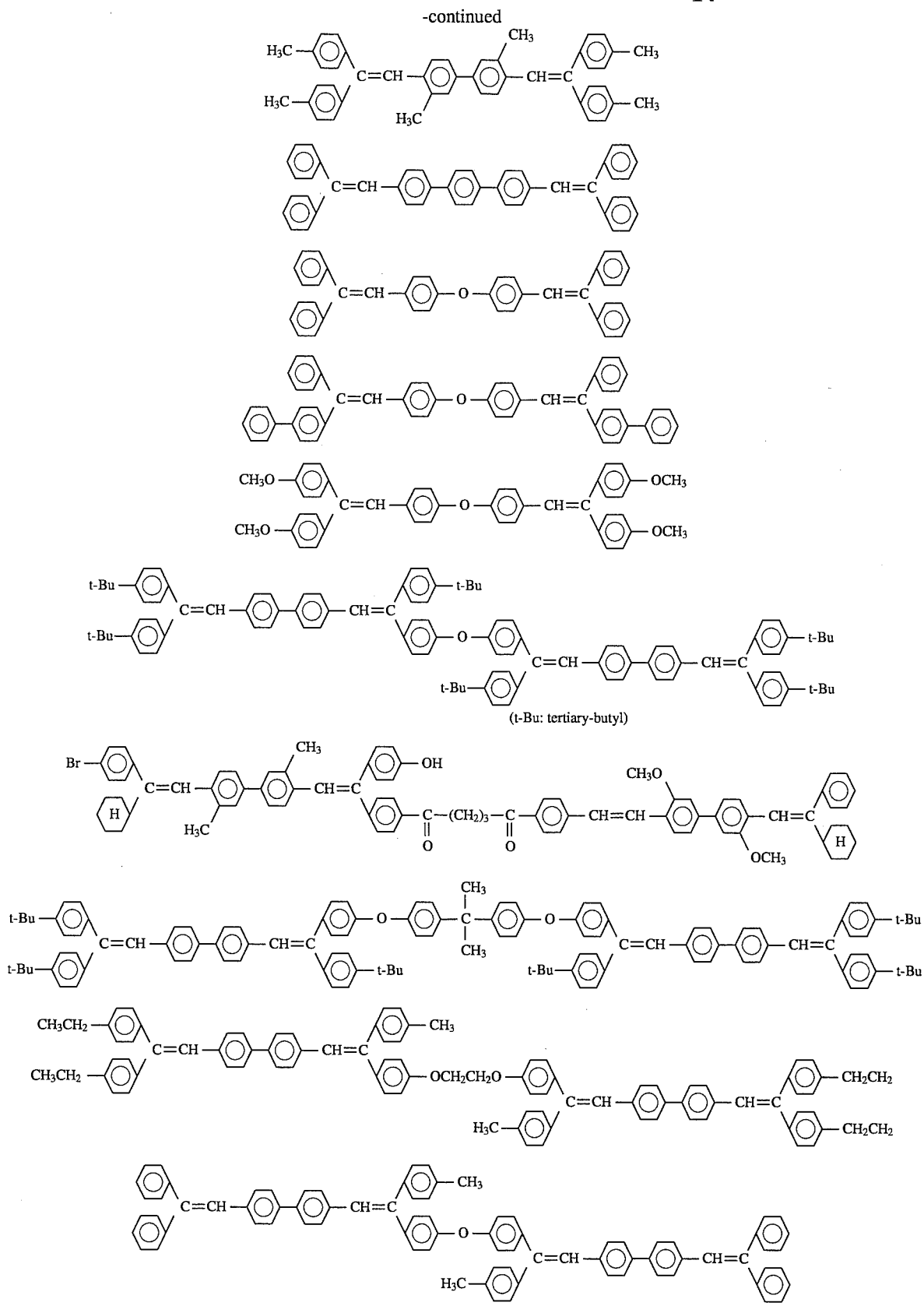

Next, the hole injecting layer in the present invention is not necessarily required for the present device, but is preferably used for the purpose of improving the emission ability. The preferable material of said hole-injecting layer is one which transports holes to the light emitting layer at a lower electric field, and still more preferably the transportation of holes is made at least $10^{-6}$ cm$^2$/volt.sec in an electric field of $10^4$ to $10^6$ volt/cm. For example, arbitrary material can be selected and used from the conventionally used ones as the electric charges injecting and transporting material for holes and the known ones to be used for the hole-injecting layer of EL devices in conventional photoconducting materials.

Examples of materials for hole-injecting layer are triazole derivatives (described in the specification of U.S. Pat. No. 3,112,197, etc.), oxadiazole derivatives (described in the specification of U.S. Pat. No. 3,189,447, etc.), imidazole derivatives (described in Japanese Patent Publication No. 16096/1962, etc.), polyarylalkane derivatives (described in the specifications of U.S. Pat. Nos. 3,615,402, 3,820,989 and 3,542,544, and in Japanese Patent Publication Nos. 555/1970 and 10983/1976, and further in Japanese Patent Application Laid-Open Nos. 93224/1976, 17105/1980, 4148/1981, 108667/1980, 156953/1980 and 36656/1981, etc.), pyrazoline derivatives or pyrazolone derivatives (described in the specifications of U.S. Pat. Nos. 3,180,729 and 4,278,746, and in Japanese Patent Application Laid-Open Nos. 88064/1980, 88065/1980, 105537/1974, 51086/1980, 80051/1981, 88141/1981, 45545/1982, 112637/1979 and 74546/1970, etc.), phenylenediamine derivatives (described in the specification of U.S. Pat. No. 3,615,404, and in Japanese Patent Publication Nos. 10105/1976, 3712/1971 and 25336/1972, and further in Japanese Patent Application Laid-Open Nos. 53435/1979, 110536/1979 and 119925/1979, etc.), arylamine derivatives (described in the specification of U.S. Pat. Nos. 3,567,450, 3,180,703, 3,240,597, 3,658,520, 4,232,103, 4,175,961 and 4,012,376, and in Japanese Patent Publication Nos. 35702/1974 and 27577/1964, and further in Japanese Patent Application Laid-Open Nos. 144250/1980, 119132/1981 and 22437/1981, and German Patent No. 1,110,518, etc.), amino-substituted chalcone derivatives (described in the specification of U.S. Pat. No. 3,526,501, etc.), oxazole derivatives (described in the specification of U.S. Pat. No. 3,257,203, etc.), styrylanthracene derivatives (described in Japanese Patent Application Laid-Open No. 46234/1981, etc.), fluorenone derivatives (described in Japanese Patent Application Laid-Open No. 110837/1979, etc.), hydrazone derivatives (described in the specification of U.S. Pat. No. 3,717,462, and in Japanese Patent Application Laid-Open Nos. 59143/1979, 52063/1980, 52064/1980, 46760/1980, 85495/1980, 11350/1982, 148749/1982, and 311591/1990, etc.), and stilbene derivatives (described in Japanese Patent Application Laid-Open Nos. 210363/1986, 228451/1986, 14642/1986, 72255/1986, 47646/1987, 36674/1987, 10652/1987, 30255/1987, 93445/1985, 94462/1985, 174749/1985, and 175052/1985, etc.)

Further, examples of hole-injecting and transporting materials are silazane derivatives (described in the specification of U.S. Pat. No. 4,950,950), polysilane based material (described in Japanese Patent Application Laid-Open No. 204996/1990), aniline-based copolymer (described in Japanese Patent Application Laid-Open No. 282263/1990), and electrically conductive high molecular oligomer disclosed in the specification of Japanese Patent Application No. 211399/1989, among them, thiophene oligomer.

In the present invention, the above compounds can be used as a hole-injecting compound, but it is preferred to use porphyrin compounds (described in Japanese Patent Application Laid-Open No. 2956965/1988, etc.), aromatic tertiary amine compounds or styrylamine compounds (described in the specification of U.S. Pat. No. 4,127,412, and Japanese Patent Application Laid-Open Nos. 27033/1978, 58445/1979, 149634/1979, 64299/1979, 79450/1980, 144250/1980, 119132/1981, 295558/1986, 98353/1986 and 295695/1988), and most preferably, said aromatic tertiary amine compounds are used.

Representative examples of said porphyrin compounds are porphin; 1,10,15,20-tetraphenyl-21H,23H-porphin copper (II), 1,10,15,20-tetraphenyl-21H,23H-porphin zinc (II), 5,10,15,20 -tetrakis(pentafluorophenyl)-21H,23H-porphin, sil iconphthalocyanine oxide, aluminum phthalocyanine chloride, phthalocyanine (nonmetal), dilithium phthalocyanine, copper tetramethylphthalocyanine, copper phthalocyanine, chrome phthalocyanine, zinc phthalocyanine, lead phthalocyanine, titanium phthalocyanine oxide, magnesium phthalocyanine, and copper octamethylphthalocyanine.

Representative examples of said aromatic tertiary amine compounds or styrylamine compounds are N,N,N',N'-tetraphenyl-4,4'-diaminophenyl, N,N'-diphenyl-N,N'-di(3-methylphenyl)-4,4'-diaminobiphenyl (TPDA), 2,2-bis(4-di-p-tolylaminophenyl)propane, 1,1-bis(4-di-p-tolylaminophenyl)-cyclohexane, N,N,N',N'-tetra-p-tolyl-4,4'-diaminobiphenyl, 1,1-bis(4-di-p-tolylaminophenyl)-4-phenylcyclohexane, bis(4-dimethylamino-2-methylphenyl)phenylmethane, bis(4-di-p-tolylaminophenyl)phenylmethane, N,N'-diphenyl-N,N'-di(4-methoxyphenyl)-4,4'-diaminobiphenyl, N,N,N',N'-tetraphenyl-4,4'-diaminodiphenylether, 4,4'-bis(diphenylamino)quadriphenyl, N,N,N-tri(p-tolyl)amine, 4-(di-p-tolylamino)-4'-[4(di-p-tolylamino)styryl] stilbene, 4-N,N-diphenylamino-(2-diphenylvinyl)benzene, 3-methoxy-4'-N,N-diphenylaminostilbene, N-phenylcarbazole, and aromatic dimethylidine-based compounds.

The hole injecting layer in the EL device of the present invention can be obtained by forming the above compound into a film by the known method of film forming such as the vacuum deposition method, the spin coating method, the casting method, and the LB method. The film thickness as said hole injecting layer is not particularly limited, but usually 5 nm to 5 μm.

The hole injecting layer may consist of one layer comprising one or two or more of these hole-injecting and transporting materials, or may be a laminate of hole injecting layer comprising other compounds than the before-mentioned hole injecting layer.

As the structure of the organic EL device to be obtained according to the present invention, the layer (adhesive layer) newly added to improve the adhesivity betweeen the light emitting layer and the cathode is desired to contain a material having a high adhesivity to the light emitting layer and the cathode. As the material having such an adhesivity, metal complexes of 8-hydroxyquinoline or derivative thereof are mentioned. Specific example of them are metal chelated oxinoide compound containing chelates of oxine (generally, 8-quinolinol or 8-hydroxyquinoline). These compounds exhibits high level properties, and are easy to be formed into thin film. Examples of the oxinoide compounds satisfy the structural formula as under.

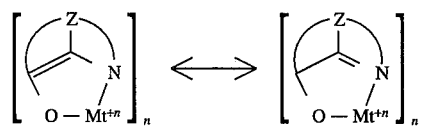

wherein Mt indicates a metal, n is an integer of 1 to 3, and Z indicates an atom required to complete at least two condensed aromatic ring, being located independently.

Therein metals represented by Mt are those which can be monovalent, divalent or trivalent metals, that is, alkali metals such as lithium, sodium and potassium, alkaline earth metals such as magnesium and calcium, and earth metals such as boron and aluminum.

Generally any of monovalent, divalent and trivalent metals which are known to be useful chelated compounds can be used therein.

Z indicates an atom to form a hetero ring comprising azole or azine as one of at least two condensed aromatic rings. Herein, if necessary, another ring can be added to the above-mentioned condensed aromatic ring. Moreover, in order to avoid adding bulky molecules without improvement in function, the number of the atoms shown by Z is preferably kept to not more than 18.

Further, specific examples of the chelated oxinoide compounds are tris(8-quinolinol)aluminum, bis(8-quinolinol)magnesium, bis(benzo-8-quinolinol)zinc, bis(2-methyl-8-quinolato)aluminumoxide, tris(8-quinolinol)indium, tris(5-methyl-8-quinolinol)aluminum, 8-quinolinol lithium, tris(5-chloro-8-quinolinol)gallium, bis(5-chloro-8-quinolinol)calcium, tris(5,7-dichloro-8-quinolinol)aluminum, tris(5,7-dibromo-8-hydroxyquinolinol)aluminum, bis(8-quinolinol)beryllium, bis(2 -methyl-8-quinolinol)beryllium, bis(8-quinolinol)zinc, bis(2 -methyl-8-quinolinol)zinc, bis(8-quinolinol)tin, and tris(7 -propyl-8-quinolinol)aluminum.

The adhesive layer in the present invention comprises preferably, in addition to the above compound, further one or more compounds. Said one or more compounds are sufficient if they are soluble in the same solvents of metal complexes of 8-hydroxyquinoline or derivative thereof, or depositable without being decomposed under appropriate conditions. Such compounds are sufficient if contaminated in an arbitrary region in the direction of the thickness of the adhesive layer. If the contamination of these additional compounds are 0.01 mol % or more, the film is kept from crystallization, allowing a constant driving of the device.

Further, it is desired that the metal complex of 8-hydroquinoline or its derivative is the largest in the ratio of molecule number in the adhesive layer. It is to maintain a stable adhesivity with metal electrode contaminated with any compound. Therein, if the metal complex of 8-hydroquinoline or its derivative is smaller than other compounds in the ratio of molecule number in the adhesive layer, the adhesive layer is easy to be removed from the metal electrode.

It is further preferred that the device is adjusted so that the voltage required to emit the initial luminaries after 100 hours of continuous driving is not more than 1.1 times the initial voltage. Since the voltage during the initial continuous 100 hours of driving usually fluctuates widely, keeping the fluctuation in the voltage constant can reduce the burden on the driving system.

Specific examples of the compounds contained in the adhesive layer in addition to metal complexes of 8-hydroquinoline or its derivative are pentacene, tetracene, rubrene, tetrabenzoperylene, benzoperylene, coronene, perylene, benzotetracene, dibenzoanthracene, and quinacridone, and the compounds given in the aforegoing description of hole-injecting layer. Particularly preferred are aromatic tertiary amine compounds and styryl amine compounds.

The thickness of the above-mentioned layer should be smaller than that of the light emitting layer, and is preferably 1 to 50 nm, particularly preferably 5 to 30 nm. Such limitation of film thickness (controlling the light emission region) is for the purpose of keeping the color of emission light blue.

Moreover, it is still preferable that in the ratio of molecular number in the adhesive layer, the ratio of metal complexes of 8-hydroxyquinoline or its derivative is the largest. More preferably, the ratio in molecule number of the metal complexes of 8-hydroxyquinoline or its derivative is 50% or more.

Similarly, preferred is a structure wherein the ratio of molecule number is adjusted so as to the voltage required to emit the initial luminance after 100 hours of continuous light emission of the resulting device is 1.1 times the initial voltage.

The adhesive layer is formed by, for instance, the spin-coating method, the casting method, or the deposition method. Preferably, the deposition method is used as in the forming of the light emitting layer and the hole injecting layer as described before.

According to the organic EL device of the present invention, it is realized that the uniformity in light emitting face is improved, and the lowering in the initial luminance can be prevented. Accordingly, the minute processing, the improvement in productivity, and further the longer lifetime of the device has come to be obtained.

Consequently, the organic EL device of the present invention is expected to be effectively used as various light-emitting materials.

The present invention will be described in greater detail with reference to the reference examples, the examples and the comparative examples as follows.

REFERENCE EXAMPLE 1

[Preparation of 4,4'-bis(2,2-diphenylvinyl)biphenyl]

(1) Production of Arylene Group-Containing Phosphonate 9.0 g of 4,4'-bis(bromomethyl)biphenyl and 11 g of triethyl phosphite were stirred on oil bath in a stream of argon for 6 hours while heated at 140° C. Then, the excessive triethyl phosphite and by-produced ethyl bromide were vacuum distilled away. The residue was allowed to stand overnight to obtain 9.5 g of a white crystal (yield: 80%). The results of analyzing the product are as follows.

Melting point: 97.0° to 100.0° C.

Determination by proton nuclear magnetic resonance ($^1$H-NMRCDCl$_3$): δ=7.0 to 7.6 ppm (m; 8H, biphenylene ring-H) δ=3.1 ppm (d; 4H, J=20 Hz ($^{31}$P-$^1$H coupling) P-CH$_2$) δ=4.0 ppm (q; 8H, ethoxymethylene-CH$_2$) δ=1.3 ppm (t; 12H, ethoxymethyl-CH$_3$)

The results as above were confirmed that the above-mentioned product was an arylene group-containing phosphonate (phosphonate: Mw=454.5) represented by the formula:

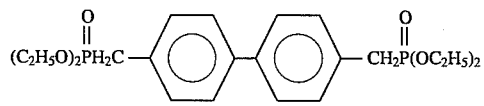

(2) Preparation of Aromatic Dimethylidine Compound 4.5 g of phosphonate as obtained in Reference Example 1 (1) and 5.5 g of benzophenone were dissolved into 100 ml of dimethylsulfoxide, and 2.2 g of potassium-t-butoxide was added thereto, and the mixture was stirred for 4 hours in an argon stream at room temperature, then allowed to stand overnight.

To the resulting mixture, 100 ml of methanol was added, and the crystal precipitated was filtered. The remainder was sufficiently washed three times with 100 ml of water, then three times with 100 ml of methanol, and purified on column to obtain 2.0 g of a yellowish orange powder (yield: 26%).

Analytical data of the product ape as follows.

Melting point: 204.5° to 206.5° C.

Determination by $^1$H-NMR (CDCl$_3$): δ=6.7 to 7.3 ppm (m; 30H, terminal phenyl ring-H, central biphenylene and methylidine =C=CH—)

The result of an elementary analysis providing the composition formula as C$_{40}$H$_{30}$ was as follows. The values in the parentheses are theoretical.

C: 94.23% (94.08%)

H: 5.84% (5.92%)

N: 0.00% (0%)

The infrared ray (IR) absorption spectrum (by KBr pellet method) is as follows.

$\nu_{C=C}$ 1520, 1620 cm$^{-1}$

By Mass Spectrum analysis, the molecular ion peak of the objective product, that is, m/Z=510 was detected out.

Above confirmed that the powder as the above-mentioned product was 4,4'-bis(2,2-diphenylvinyl)biphenyl represented by the formula:

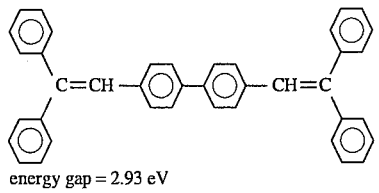

energy gap = 2.93 eV

Examples 1 to 11

Indium tin oxide (ITO) was provided on a 25 mm×75 mm×1.1 mm glass substrate in a 100 nm thick film formed by the vapor deposition method to obtain a transparent supporting substrate. Said substrate was ultrasonically washed with isopropylalcohol for 5 minutes and further five minutes in pure water, then subjected to UV ozone washing for 10 minutes in an apparatus manufactured by Samco International Institute Inc. Said transparent supporting substrate was attached to a substrate holder of a commercially available vapor deposition system (manufactured by ULVAC Co., Ltd.), 200 mg of N,N'-bis(3 -methylphenyl)-N,N'-diphenyl[1,1'-biphenyl]-4,4'-diamine(TPD) was placed in an electrically-heated boat made of molybdenum, and 200 mg of 4,4'-bis(2,2-diphenylvinyl)biphenyl (DPVBi) obtained in Reference Example 1 was placed in another boat made of molybdenum, and the pressure in the vacuum chamber was decreased to 1×10$^{-4}$ Pa. After that, said boat containing TPD was heated to 215° to 220° C., and TPD was vapor-deposited on the transparent supporting substrate at a deposition rate of 0.1 to 0.3 nm/sec to obtain a hole injection layer of 60 nm in film thickness. In this deposition process, the substrate was at room temperature.

Without taking the substrate out of the vacuum chamber, DPVBi from another boat was laminate-deposited in thickness of 40 nm on the hole injection layer to form the light emitting layer. The deposition was performed with a boat temperature of 240° C. at a deposition rate of 0.1 to 0.3 nm/sec, and the substrate was at room temperature.

Subsequently, the pressure in the vacuum chamber was raised to the atmospheric pressure, and 200 g of metal complexes of 8-hydroxyquinoline or its derivative as the material of the adhesive layer ((A) in Table 1) was newly placed in an electrically-heated boat made of molybdenum, and further 50 mg of an organic compound ((B) in Table 1) was added thereto, then the pressure of vacuum chamber was reduced to 1×10$^{-4}$ Pa. Then, the boat containing (A) was heated ((C) in Table 1) with a deposition rate of 1.2 to 1.5 nm/sec, and the boat containing (B) was heated ((D) in Table 1) with a deposition rate of 0.01 to 0.03 nm/sec, thus they were deposited simultaneously to form an adhesive layer with a film thickness of 20 nm.

Then, the pressure of the vacuum chamber was raised to the atmospheric pressure, and a stainless steel mask was placed on said layer film, which was fixed on the substrate holder. In the electrically-heated boat made of molybdenum, 1 g of magnesium ribbon was placed, and 500 mg of silver wire was placed in a tungsten basket, and the pressure was reduced. After the pressure in the vacuum chamber was reduced to 1×10$^{-4}$ Pa, silver was deposited at the deposition rate of 0.1 nm/sec, and simultaneously magnesium was deposited at a deposition rate of 1.4 nm/sec to form a counter electrode with a film thickness of 150 nm.

Examples 12

A device was produced in the same manner as in Example except that 1,1,4,4,-tetraphenyl-1,3-butadiene (energy gap: 2.80 eV) was used in place of DPVBi.

Herein, energy gaps of (A) in Examples are shown as follows.

| (A) | energy gap |
|---|---|
| tris(8-quinolinol)aluminum | 2.50 eV |
| bis(8-quinolinol)aluminum | 2.43 eV |
| tris(8-quinolinol)indium | 2.33 eV |
| bis(8-quinolinol)zinc | 2.30 eV |
| bis(8-quinolinol)zinc | 2.20 eV |

TABLE 1

| | (A) | (B) | (C) °C. | (D) °C. |
|---|---|---|---|---|
| Example 1 | tris(8-quinolinol)aluminum | rubrene*$^1$ | 230 | 310 |
| Example 2 | tris(8-quinolinol)aluminum | TPD*$^2$ | 230 | 215 |
| Example 3 | tris(8-quinolinol)aluminum | Fastogen Super Red 7094Y*$^3$ | 230 | 350 |
| Example 4 | bis(8-quinolinol)magnesium | rubrene*$^1$ | 410 | 310 |
| Example 5 | bis(8-quinolinol)magnesium | TPD*$^2$ | 410 | 215 |
| Example 6 | tris(8-quinolinol)indium | rubrene*$^1$ | 315 | 310 |
| Example 7 | tris(8-quinolinol)indium | TPD*$^2$ | 315 | 215 |
| Example 8 | bis(8-quinolinol)zinc | rubrene*$^1$ | 315 | 310 |
| Example 9 | bis(8-quinolinol)zinc | TPD*$^2$ | 315 | 215 |
| Example 10 | bis(8-quinolinol)zinc | Fastogen Super Red 7094Y*$^3$ | 315 | 350 |
| Example 11 | bis(8-quinolinol)tin | TPD*$^2$ | 220 | 215 |
| Example 12 | tris(8-quinolinol)aluminum | rubrene*$^1$ | 230 | 310 |

*$^1$produced by Aldrich Chemical Company, Inc.
The structural formula is as follows.

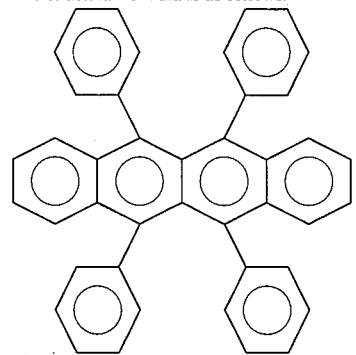

*$^2$N,N'-bis(3-methylphenyl)-N,N'-diphenyl[1,1'-biphenyl]-4,4'-diamine
*$^3$produced by Dainippon Ink. & Chemical Incorp.
The structural formula is as follows.

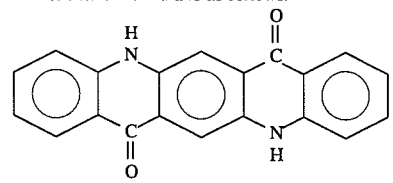

Comparative Example 1

On a 25 mm×75 mm×1.1 mm glass substrate, ITO was provided in a 100 nm thick film formed by the vapor deposition method to obtain a transparent supporting substrate. Said substrate was ultrasonically washed with isopropyl alcohol for 5 minutes and further five minutes in pure water, then subjected to UV ozone washing for 10 minutes in an apparatus manufactured by Samco International Institute Inc. Said transparent supporting substrate was attached to a substrate holder of a commercially available vapor deposition system (manufactured by ULVAC Co., Ltd.), 200 mg of TPD was placed in an electrically-heated boat made of molybdenum, and 200 mg of DPVBi obtained in Reference Example 1 was placed in another boat made of molybdenum, and the pressure in the vacuum chamber was decreased to $1 \times 10^{-4}$ Pa. After that, said boat containing TPD was heated to 215° to 220° C., and TPD was vapor-deposited on the transparent supporting substrate at a deposition rate of 0.1 to 0.3 nm/sec to obtain a hole injecting layer of 60 nm in film thickness. In this deposition process, the substrate was at room temperature. Without taking the substrate out of the vacuum chamber, DPVBi from another boat was laminate-deposited in thickness of 40 nm on the hole injection layer to form the light emitting layer. The deposition was performed with a boat temperature of 240° C. at a deposition rate of 0.1 to 0.3 nm/sec, and the substrate was at room temperature.

The substrate was taken out from the vacuum chamber, a stainless steel mask was placed on said light emitting layer, which was fixed again on the substrate holder. Subsequently, in a boat made of molybdenum, 200 mg of tris(8-quinolinol)aluminum ($Alq_3$) was placed and deposited in the vacuum chamber. Further, in the electrically-heated boat made of molybdenum, 1 g of magnesium ribbon was placed, and 500 mg of silver wire was placed in a tungsten basket, and deposited. After the pressure in the vacuum chamber was reduced to $1 \times 10^{-4}$ Pa, the boat containing $Alq_3$ was heated to 230° C., and deposited in a thickness of 20 nm at a deposition rate of 0.01 to 0.03 nm/sec. Further, silver was deposited at the deposition rate of 0.1 nm/sec, and simultaneously, by the electrically heating method, magnesium was deposited at a deposition rate of 1.4 nm/sec from another molybdenum boat to form a counter electrode with a film thickness of 150 nm.

Comparative Example 2

On a 25 mm×75 mm×1.1 mm glass substrate, ITO was provided in a 100 nm thick film formed by the vapor deposition method to obtain a transparent supporting substrate. Said substrate was ultrasonically washed with isopropyl alcohol for 5 minutes and further 5 minutes in pure water, then subjected to UV ozone washing for 10 minutes in an apparatus manufactured by Samco International Institute Inc. Said transparent supporting substrate was attached to a substrate holder of a commercially available vapor deposition system (manufactured by ULVAC Co., Ltd.), 200 mg of TPD was placed in an electrically-heated boat made of molybdenum, and 200 mg of DPVBi obtained in Reference Example 1 was placed in another boat made of molybdenum, and the pressure in the vacuum chamber was decreased to $1 \times 10^{-4}$ Pa. After that, said boat containing TPD was heated to 215° to 220° C., and TPD was vapor-deposited on the transparent supporting substrate at a deposition rate of 0.1 to 0.3 nm/sec to obtain a hole injecting layer of 60 nm in film thickness. In this deposition process, the substrate was at room temperature. Without taking the substrate out of the vacuum chamber, DPVBi from another boat was laminate-deposited in thickness of 40 nm on the hole injection layer to form the emitting layer. The deposition was performed with a boat temperature of 240° C. at a deposition rate of 0.1 to 0.3 nm/sec, and the substrate was at room temperature.

The substrate was taken out from the vacuum chamber, a stainless steel mask was placed on said emitting layer, which was fixed again on the substrate holder. Subsequently, in a boat made of molybdenum, 200 mg of bis(8-quinolinol)magnesium ($Mgq_2$) was placed and deposited on the vacuum chamber. Further, in the electrically-heated boat made of molybdenum, 1 g of magnesium ribbon was placed, and 500 mg of silver wire was placed in a tungsten basket, and deposited. After the pressure in the vacuum chamber was reduced to $1 \times 10^{-4}$ Pa, the boat containing $Mgq_3$ was heated to 410° C., and deposited in a thickness of 20 nm at a deposition rate of 0.01 to 0.03 nm/sec. Further, silver was deposited at the deposition rate of 0.1 nm/sec, and simultaneously, by the electrically heating method, magnesium was deposited at a deposition rate of 1.4 nm/sec from another molybdenum boat to form a counter electrode with a film thickness of 150 nm.

Comparative Example 3

On a 25 mm×75 mm×1.1 mm glass substrate, ITO was provided in a 100 nm thick film formed by the vapor deposition method to obtain a transparent supporting substrate. Said substrate was ultrasonically washed with isopropyl alcohol for 5 minutes and further five minutes in pure water, then subjected to UV ozone washing for 10 minutes in an apparatus manufactured by Samco International Institute Inc. Said transparent supporting substrate was attached to a substrate holder of a commercially available vapor deposition system (manufactured by ULVAC Co., Ltd.), 200 mg of TPD was placed in an electrically-heated boat made of molybdenum, and 200 mg of DPVBi obtained in Reference Example 1 was placed in another boat made of molybdenum, and the pressure in the vacuum chamber was decreased to $1 \times 10^{-4}$ Pa. After that, said boat containing TPD was heated to 215° to 220° C., and TPD was vapor-deposited on the transparent supporting substrate at a deposition rate of 0.1 to 0.3 nm/sec to obtain a hole injection layer of 60 nm in film thickness. In this deposition process, the substrate was at room temperature. Without taking the substrate out of the vacuum chamber, DPVBi from another boat was laminate-deposited in thickness of 40 nm on the hole injecting layer to form the light emitting layer. The deposition was performed with a boat temperature of 240° C. at a deposition rate of 0.1 to 0.3 nm/sec, and the substrate was at room temperature.

The substrate was taken out from the vacuum chamber, a stainless steel mask was placed on said light emitting layer, which was fixed again on the substrate holder. Subsequently, in a boat made of molybdenum, 200 mg of tris(8-quinolinol)indium ($Inq_3$) was placed and deposited on the vacuum chamber. Further, in the electrically-heated boat made of molybdenum, 1 g of magnesium ribbon was placed, and 500 mg of silver wire was placed in a tungsten basket, and deposited. After the pressure in the vacuum chamber was reduced to $1 \times 10^{-4}$ Pa, the boat containing $Inq_3$ was heated to 315° C., and deposited in a thickness of 20 nm at a deposition rate of 0.01 to 0.03 nm/sec. Further, silver was deposited at the deposition rate of 0.1 nm/sec, and simultaneously, by the electrically heating method, magnesium was deposited at a deposition rate of 1.4 nm/sec from another molybdenum boat to form a counter electrode with a film thickness of 150 nm.

The devices obtained in Examples 1 to 12 and Comparative Examples 1 to 3 were subjected to aging by applying DC electric field every two seconds with an interval of $4.2 \times 10^4$ V/cm up to 1 to $1.3 \times 10^6$ V/cm with ITO as the anode and metal electrodes as the cathodes in the atmosphere. Further, in Fluorinert® (FC-70, produced by Sumitomo 3M Ltd.), aging was conducted for 10 minutes with an initial luminance of 100 cd/m².

The devices thus obtained were made to emit light continuously by driving by DC in Fluorinert® with setting an initial luminance of 100 cd/m². After 50 hours of the continuous light emitting, the devices were evaluated on brightness and its uniformity under the conditions below. The results are shown in Table 2.

Uniformity: The devices were made to emit light at a brightness of 100 cd/m², the emitting surfaces were observed by the use of a luminance meter (CS-100, manufactured by Minolta Camera Co.), and evaluation was made as follows.

X: The region observed has non-emission region with a diameter of 10 μm or more, or has ununiformity in color.

o: The region observed is uniformly emitted (without non-emission region or ununiformity in color)

Further, after 100 hours of continuous light emitting, the luminance and the voltage of the device were measured to find the ratio to the initial voltage (the voltage after 100 hours/the initial voltage). The result is shown in Table 2.

TABLE 2

|  | After 50 hours of driving | | After 100 hours of driving | |
|---|---|---|---|---|
|  | Luminance (cd/m²) | Uniformity | Luminance (cd/m²) | Voltage ratio |
| Example 1 | 100 | O | 95 | 1.03 |
| Example 2 | 100 | O | 93 | 1.03 |
| Example 3 | 98 | O | 92 | 1.01 |
| Example 4 | 100 | O | 94 | 1.05 |
| Example 5 | 100 | O | 93 | 1.06 |
| Example 6 | 95 | O | 91 | 1.05 |
| Example 7 | 95 | O | 90 | 1.07 |
| Example 8 | 98 | O | 92 | 1.03 |
| Example 9 | 98 | O | 92 | 1.03 |
| Example 10 | 95 | O | 90 | 1.05 |
| Example 11 | 92 | O | 90 | 1.06 |
| Example 12 | 92 | O | 90 | 1.09 |
| Comparative Example 1 | 75 | x | 69 | 1.23 |
| Comparative Example 2 | 70 | x | 67 | 1.30 |
| Comparative Example 3 | 65 | x | 60 | 1.28 |

What is claimed is:

1. An organic electroluminescence device which comprises laminating layers in the order of anode/light emitting layer/adhesive layer/cathode, or anode/hole-injecting layer/light emitting layer/adhesive layer/cathode, wherein the adhesive layer comprises a metal complex of 8-hydroxyquinoline or a metal complex of a 8-hydroxyquinoline derivative, said adhesive layer further comprising at least one additional organic compound in an arbitrary region in the direction of the thickness of the adhesive layer, the thickness of which is smaller than that of the light emitting layer, and wherein the light emitting layer has an energy gap larger than that of the metal complex of 8-hydroxyquinoline or the metal complex of 8-hydroxyquinoline derivative contained in the adhesive layer, and wherein the light emitting layer comprises a compound which emits blue, greenish blue or bluish green light in CIE chromaticity coordinates.

2. The organic electroluminescence device as defined in claim 1 wherein the light emitting layer comprises a compound represented by the general formula (I):

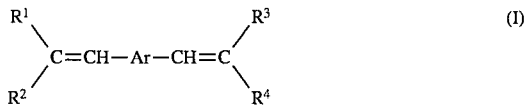

wherein $R^1$ to $R^4$ indicate each a hydrogen atom, an alkyl group having 1 to 6 carbon atoms, an aralkyl group having 7 to 8 carbon atoms, an aryl group having 6 to 18 carbon atoms, a cyclohexyl group, an aryloxy group having 6 to 18 carbon atoms, or an alkoxy group having 1 to 6 carbon atoms; wherein said aryl, cyclohexyl or aryloxy groups, independently may be substituted by one or more substituents selected from the group consisting of an alkyl group having 1 to 6 carbon atoms, an alkoxy group having 1 to 6 carbon atoms, an aralkyl group having 7 to 8 carbon atoms, an aryloxy group having 6 to 18 carbon atoms, an acyl group having 1 to 6 carbon atoms, an acyloxy group having 1 to 6 carbon atoms, a carboxyl group, a styryl group, an arylcarbonyl group having 6 to 20 carbon atoms, an aryloxycarbonyl group having 6 to 20 carbon atoms, an alkoxycarbonyl group having 1 to 6 carbon atoms, an anilinocarbonyl group, a carbamoyl group, a phenyl group, a nitro group, a hydroxy group and a halogen; wherein $R^1$ to $R^4$ may be the same or different, and $R^1$ and $R^2$ or $R^3$ and $R^4$, may, independently, combine to form a substituted or unsubstituted saturated five-membered ring or a substituted or unsubstituted saturated six-membered ring; Ar indicates a substituted or unsubstituted arylene group having 6 to 20 carbon atoms, a single bond, or a conjugated polyene having 2 to 6 carbon atoms; wherein said arylene group may be mono-substituted or poly-substituted, and may be any of ortho-, para- and meta-arylene; however, when Ar is an unsubstituted phenylene, $R^1$ to $R^4$ are each selected from the group consisting of an alkoxy group having 1 to 6 carbon atoms, an aralkyl group having 7 to 8 carbon atoms, a substituted or unsubstituted naphthyl group, a biphenyl group, a cyclohexyl group, and an aryloxy group, or general formula (II):

wherein A and B indicate each a monovalent group which is obtained by removing a hydrogen atom from the compound represented by the above general formula (I), and may be identical to or different from each other; Q indicates a divalent group breaking the conjugation system, or general formula (III)

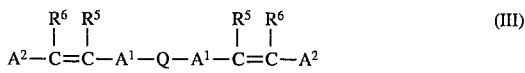

wherein $A^1$ indicates a substituted or unsubstituted arylene group having 6 to 20 carbon atoms or a divalent aromatic heterocyclic group; $A^1$ has a position of bond site which may be any of ortho-, meta and para-; $A^2$ is a substituted or unsubstituted aryl group having 6 to 20 carbon atoms or a monovalent aromatic heterocyclic group; $R^5$ and $R^6$ indicate each a hydrogen atom, a substituted or unsubstituted aryl group having 6 to 20 carbon atoms, a cyclohexyl group, a monovalent aromatic heterocyclic group, an alkyl group having 1 to 10 carbon atoms, an aralkyl group having 7 to 20 carbon atoms or an alkoxy group having 1 to 10 carbon atoms; $R^5$ and $R^6$ may be the same or different and may be mono-substituted by an alkyl group, an aryloxy group, an amino group, or a phenyl group with or without a substituent;

wherein each substituent of $R^5$ may combine with $A^1$ to form a saturated or unsaturated five-membered ring or six-membered ring, and similarly each substituent of $R_6$ may combine with $A^2$ to form a saturated or unsaturated five-membered ring or six-membered ring; and Q indicates a divalent group breaking the conjugation.

3. The organic electroluminescence device as defined in claim 2 wherein the adhesive layer is a mixture of a metal complex of 8-hydroxyquinoline or a metal complex of a 8-hydroxyquinoline derivative and at least one additional organic compound, and the metal complex of 8-hydroxyquinoline or metal complex of 8-hydroxyquinoline derivative is the most abundant component on a molar basis in the adhesive layer.

4. The organic electroluminescence device as defined in claim 2 wherein the adhesive layer is a mixture of a metal complex of 8-hydroxyquinoline or a metal complex of a 8-hydroxyquinoline derivative and at least one additional organic compound, and wherein the total amount of the at least one additional organic compound in the adhesive layer is at least 0.01 mol %, and the amount of the metal complex of 8-hydroxyquinoline or the metal complex of the 8-hydroxyquinoline derivative in the adhesive layer is 50 mol % or more.

5. The organic electroluminescence device as defined in claim 2 wherein the metal complex of a 8-hydroxyquinoline derivative is a chelated oxinoide compound.

6. The organic electroluminescence device as defined in claim 5 wherein the chelated oxinoide compound is tris(8-quinolinol)aluminum, bis(8-quinolinol)magnesium, bis-(benzo-8-quinolinol)zinc, bis(2-methyl-8-quinolato)aluminumoxide, tris(8-quinolinol)indium, tris(5-methyl-8-qinolinol)aluminum, 8-quinolinol lithium, tris(5-chloro-8-quinolinol)gallium, bis(5-chloro-8-quinolinol)calcium, 5,7-dichloro-8-qinolinolaluminum, tris(5,7-dibromo-8-hydroxyquinolinol)aluminum, bis(8-quinolinol)beryllium, bis(2-methyl-8-quinolinol)beryllium, bis(8-quinolinol)zinc, bis(2-methyl-8-quinolinol)zinc, bis(8-quinolinol)tin, or tris(7-propyl-8-quinolinol)aluminum.

7. The organic electroluminescence device according to claim 2, wherein Ar is an ortho, para or meta arylene group which may be monosubstituted or polysubstituted.

* * * * *